United States Patent [19]

Miller et al.

[11] Patent Number: 5,009,770
[45] Date of Patent: Apr. 23, 1991

[54] SIMULTANEOUS UPGRADING AND DEDUSTING OF LIQUID HYDROCARBON FEEDSTOCKS

[75] Inventors: Jeffrey T. Miller, Naperville, Ill.; Albert L. Hensley, Jr., Munster, Ind.

[73] Assignee: Amoco Corporation, Chicago, Ill.

[21] Appl. No.: 238,929

[22] Filed: Aug. 31, 1988

[51] Int. Cl.$^5$ .................. C10G 13/02; C10G 23/00
[52] U.S. Cl. .................. 208/209; 208/177; 208/211; 208/212; 208/213; 208/254 H; 208/251 H; 208/412; 208/424; 208/426; 208/428; 208/400; 208/435
[58] Field of Search .............. 208/412, 424, 426, 428, 208/435, 400, 177, 209, 211, 212, 213, 254 H

[56] References Cited

U.S. PATENT DOCUMENTS

| | | | |
|---|---|---|---|
| 3,331,769 | 7/1967 | Gatsis | 208/254 H |
| 3,484,364 | 12/1969 | Hemminger | 208/412 |
| 3,778,365 | 12/1973 | Hamner et al. | 208/254 H |
| 4,075,081 | 2/1978 | Gregoli | 208/426 |
| 4,153,540 | 5/1979 | Gorring | 208/254 H |
| 4,158,622 | 7/1979 | Schwarzenbek | 208/254 H |
| 4,159,940 | 7/1979 | Smith | 208/254 H |
| 4,415,434 | 11/1983 | Hargreaves et al. | 208/177 |
| 4,428,826 | 1/1984 | Walsh | 208/120 |
| 4,493,762 | 1/1985 | Rudnick | 208/428 |
| 4,529,497 | 7/1985 | Watson et al. | 208/424 |
| 4,536,278 | 8/1985 | Tatterson et al. | 208/424 |
| 4,539,096 | 9/1985 | Rudnick | 208/428 |
| 4,548,702 | 10/1985 | York et al. | 208/424 |
| 4,618,410 | 10/1986 | Brinckman et al. | 208/97 |
| 4,732,664 | 3/1988 | Solari Martini et al. | 208/212 |

Primary Examiner—Helane Myers
Attorney, Agent, or Firm—Thomas W. Tolpin; William H. Magidson; Ralph C. Medhurst

[57] ABSTRACT

A process of concurrently dedusting and upgrading particulate laden raw, whole retort oil is provided which comprises the steps of: retorting solid hydrocarbon-containing material such as oil shale to liberate an effluent stream of dust laden hydrocarbons; injecting the dust-laden retort effluent product stream into a catalytic hydrotreater; agitating the product stream in the hydrotreater to constantly maintain the particulates in suspension within the oil; catalytically hydrotreating the agitated product stream in the presence of a hydroprocessing gas at a pressure of from 500 to 3000 psi, a temperature of from 650° to 850° F. and a space velocity of from 0.1 to 6.0 hr$^{-1}$, whereby the suspended particulates are agglomerated to facilitate solid-liquid separation and substantial amounts of sulfur and nitrogen contaminants are simultaneously removed from the resulting ungraded oil; and mechanically separating the agglomerated particulates from the upgraded whole oil. The product oil may be further upgraded either by treatment with aqueous sulfuric acid or by hydrotreatment.

10 Claims, 2 Drawing Sheets

FEED INLET   PRODUCT OUTLET

SIMULTANEOUS UPGRADING AND DEDUSTING OF LIQUID HYDROCARBON FEEDSTOCKS

BACKGROUND OF THE INVENTION

This invention relates to a process for producing commercial and military grade jet fuels from retort oil containing particulates of spent and retorted solid hydrocarbon-containing materials.

Researchers have renewed their efforts to find alternate sources of energy and hydrocarbons in view of past rapid increases in the price of crude oil and natural gas. Much research has been focused on recovering hydrocarbons from solid hydrocarbon-containing material such as oil shale, coal and tar sands by pyrolysis or upon gasification to convert the solid hydrocarbon-containing material into more readily usable gaseous and liquid hydrocarbons.

Vast natural deposits of oil shale found in the United States and elsewhere contain appreciable quantities of organic matter known as "kerogen" which decomposes upon pyrolysis or distillation to yield oil, gases and residual carbon. It has been estimated that an equivalent of 7 trillion barrels of oil are contained in oil shale deposits in the United States, with almost sixty percent located in the rich Green River oil shale deposits of Colorado, Utah and Wyoming. The remainder is contained in the leaner Devonian-Mississippian black shale deposits which underlie most of the eastern part of the United States.

As a result of dwindling supplies of petroleum and natural gas, extensive efforts have been directed to develop retorting processes which will economically produce shale oil on a commercial basis from these vast resources.

Generally, oil shale is a fine-grained sedimentary rock stratified in horizontal layers with a variable richness of kerogen content. Kerogen has limited solubility in ordinary solvents and therefore cannot be efficiently converted to oil by extraction. Upon heating oil shale to a sufficient temperature, the kerogen is thermally decomposed to liberate vapors, mist, and liquid droplets of shale oil and light hydrocarbon gases such as methane, ethane, ethene, propane and propene, as well as other products such as hydrogen, nitrogen, carbon dioxide, carbon monoxide, ammonia and hydrogen sulfide. A carbon residue typically remains on the retorted shale.

Shale oil is not a naturally occurring product, but is formed by the pyrolysis of kerogen in the oil shale. Crude shale oil, sometimes referred to as "retort oil," is the liquid oil product recovered from the liberated effluent of an oil shale retort. Synthetic crude oil (syncrude) is upgraded crude shale oil.

The process of pyrolyzing the kerogen in oil shale, known as retorting, to form liberated hydrocarbons can be done in surface retorts in aboveground vessels or in situ retorts underground. In principle, the retorting of shale and other hydrocarbon-containing materials, such as coal and tar sands, comprises heating the solid hydrocarbon-containing material to an elevated temperature and recovering the vapors and liberated effluent. However, as medium grade oil shale yields approximately 20 to 25 gallons of oil per ton of shale, the expense of materials handling is critical to the economic feasibility of a commercial operation.

In surface retorting, oil shale is mined from the ground, brought to the surface, crushed and placed in vessels where it can be contacted with a hot solid heat carrier material, such as hot spent shale, ceramic balls, metal balls, or sand or a gaseous heat carrier material, such as light hydrocarbon gases, for heat transfer. The resulting high temperatures cause shale oil to be liberated from the oil shale leaving a retorted, inorganic material and carbonaceous material such as coke. The carbonaceous material can be burned by contact with oxygen at oxidation temperatures to recover heat and to form a spent oil shale relatively free of carbon. Spent oil shale which has been depleted in carbonaceous material can be removed from the retort and recycled as heat carrier material or discarded. The combustion gases are dedusted in cyclones, electrostatic precipitators, or other gas-solid separation systems.

During fluid bed, moving bed and other types of surface retorting, decrepitation of oil shale occurs when particles of oil shale collide with each other or impinge against the walls of the retort forming substantial quantities of minute entrained particulates of shale dust. The use of hot spent shale as heat carrier material can aggravate the dust problem. Rapid retorting is desirable to minimize thermal cracking of valuable condensable hydrocarbons. Shale dust is also emitted and carried away with the effluent product stream during modified in situ retorting, but dust emission is not as aggravated as in other types of surface retorting.

Shale dust ranges in size from less than 1 micron to several microns and is entrained and carried away with the effluent product stream. Because shale dust is so small, it cannot be effectively removed to commercially acceptable levels by conventional dedusting equipment.

The retorting, carbonization or gasification of coal, peat and lignite and the retorting or extraction of tar sands, gilsonite, and oil-containing diatomaceous earth create similar dust problems.

After retorting, it has been the practice to convey the effluent product stream of liberated hydrocarbons and entrained dust to a separator, such as single or multiple stage distillation column, quench tower, scrubbing cooler or condenser, where it can be separated into fractions of light gases, light oils, middle oils and heavy oils with the bottom heavy oil fraction containing essentially all of the dust. As much as 65% by weight of the bottom heavy oil fraction may consist of dust.

The prior art has considered it to be necessary to partially dedust the effluent product stream by conventional physical separating means, and to subsequently fractionate the effluent stream and isolate the dust in the bottom heavy oil fraction, where it must be subsequently removed prior to upgrading into more marketable products, such as light oils and middle oils. Dust laden heavy oil is known to plug up hydrotreaters and catalytic crackers, abrade valves, heat exchangers, outlet orifices, pumps and distillation towers, build up insulative layers on heat exchange surfaces reducing their efficiency and foul other equipment. Furthermore, the dusty heavy oil erodes turbine blades and creates emission problems. Moreover, the dusty heavy oil cannot be refined with conventional equipment.

In an effort to solve the dust problem preliminary partial dedusting by, for example, electrostatic precipitators, has been used as well as cyclones located both inside and outside the retort. Electrostatic precipitators and cyclones, however, must be operated at high temperatures and the product stream must be maintained at approximately the temperature attained during the retorting process to prevent any condensation and accumulation of dust on processing equipment. Maintaining the effluent stream at high temperatures allows detrimental side reactions, such as cracking, coking and polymerization of the effluent product stream, which tends to decrease the yield and quality of condensable hydrocarbons.

Over the years, various processes and equipment have been suggested to decrease the dust concentration in the heavy oil fraction and/or upgrade the heavy oil into more marketable light oils and medium oils. Such prior art dedusting processes and equipment have included the use of cyclones, electrostatic precipitators, pebble beds, scrubbers, filters, electric treaters, spiral tubes, ebullated bed catalytic hydrotreaters, desalters, autoclave settling zones, sedimentation, gravity, settling, percolation, hydrocloning, magnetic separation, electrical precipitation, stripping and binding, as well as the use of diluents, solvents and chemical additives before centrifuging. Typifying those prior art processes and equipment and related processes and equipment are those described in U.S. Pat. Nos. 1,668,898; 1,687,763; 1,703,192; 1,707,759; 1,788,515; 2,235,639; 2,524,859; 2,717,865; 2,719,114; 2,723,951; 2,793,104; 2,879,224; 2,899,736; 2,904,499; 2,911,349; 2,952,620; 2,968,603; 2,982,701; 3,008,894; 3,034,979; 3,058,903; 3,252,886; 3,255,104; 3,468,789; 3,560,369; 3,684,699; 3,703,442; 3,784,462; 3,799,855; 3,808,120; 3,900,389; 3,901,791; 3,910,834; 3,929,625; 3,951,771; 3,974,073; 3,990,885; 4,028,222; 4,040,958; 4,049,540; 4,057,490; 4,069,133; 4,080,285; 4,088,567; 4,105,536; 4,151,067; 4,151,073; 4,158,622; 4,159,949; 4,162,965; 4,166,441; 4,182,672; 4,199,432; 4,220,522; 4,226,699; 4,246,093; 4,293,401; 4,324,651; 4,354,856; 4,388,179; 4,404,085; 4,415,430; 4,415,434; 4,421,629; 4,473,461; 4,536,277; 4,536,278; 4,544,477; and 4,548,702 as well as in the articles by Rammler, R. W., *The Retorting of Coal, Oil Shale, and Tar Sand by Means of Circulating Fine-grained Heat Carriers as a Preliminary Stage in the Production of Synthetic Crude Oil,* Vol. 65, No. 4, Quarterly of the Colorado School of Mines, pp. 141-167 (October 1970) and Schmalfeld, I. P., *The Use of the Luroi/Ruhroas Process for the Distillation of Oil Shale,* Vol. 70, No. 3, Quarterly of the Colorado School of Mines, pp. 129-145 (July 1975).

The process described in U.S. Pat. No. 4,548,702, by York et. al., which is representative of the pertinent prior art, comprises: first stabilizing raw oil shale retort product stream by mild hydrotreatment; injecting the stabilized stream into a gas-solid separating device such as a cyclone to partially dedust it; fractionating the partially dedusted stream into a dust-concentrated heavy fraction and a low-particulate light fraction; returning the dust-concentrated fraction to the retort; deep hydrotreating of the stabilized partially dedusted fraction to yield synthetic crude oil; and further upgrading to produce final products.

The above prior art processes, necessitating preliminary partial dedusting and fractionation to concentrate particulates in heavy fractions which are then recirculated with fresh feedstock to maintain an increased dust load on the system, require greater plant capacity and additional process equipment as a result of the steps preliminary to upgrading.

It is therefore desirable to provide an improved process for directly and concurrently dedusting and upgrading particulate laden oils. The present invention provides such a process.

SUMMARY OF THE INVENTION

An improved process is provided for simultaneously dedusting and upgrading whole, raw retort oil containing particulates of spent and retorted oil shale in a manner which yields distillate, and commercial and military specification diesel and jet fuels. The novel process of concurrently dedusting and upgrading particulate laden whole retort oil to produce synthetic crude oil comprises the steps of: (a) retorting solid hydrocarbon-containing material to liberate an effluent stream of dust laden hydrocarbons; (b) separating the effluent product stream from retort water; (c) feeding the raw, dust-laden retort effluent product stream into a catalytic hydrotreater; (d) agitating the product stream in the hydrotreater to constantly maintain the dust particles in suspension within the oil; (e) catalytically hydrotreating the agitated product stream in the presence of a hydroprocessing gas at a pressure of from 500 to 3000 psi, a temperature of from 650° to 850° F. and a space velocity of from 0.5 to 6.0 hr$^{-1}$, whereby the suspended particulates are agglomerated to facilitate solid-liquid separation and substantial amounts of sulfur and nitrogen contaminants are simultaneously removed from the resulting upgraded oil; and (f) mechanically separating the agglomerated particulates from the upgraded whole oil. The dedusted, upgraded product can be further upgraded, if desired, by hydrotreating or non-catalytic acid treatment.

By this process shale oil can be produced above ground in surface retorts, in solvent extraction vessels, or underground in modified or true in situ retorts. In the preferred form, the oil is produced in a surface retort, by mixing raw oil shale in the retort with solid heat carrier material, such as spent oil shale, at sufficient retorting temperatures to liberate an effluent stream of hydrocarbons containing entrained particulates of oil shale dust. The surface retort can be a static mixer retort, gravity flow retort or rotating pyrolysis drum retort. Such retorts typically include a surge bin, collection vessel, or accumulator. Other types of retorts such as rock pump retorts and rotating grate retorts can be used.

As disclosed above, in the preferred form, the effluent product stream is catalytically hydrotreated under constant agitation in a reactor, preferably a back-mixed or ebullated (expanded) bed reactor under controlled conditions, resulting in an upgraded oil from which solids are readily removed. In addition, catalytic treatment substantially improves the quality of the oil by removing high levels of sulfur, oxygen, nitrogen, and polyaromatic molecules.

After hydrotreating, solids can be readily removed by a number of techniques, such as, for example, filtration, centrifugation, etc. In highly upgraded shale oil, the ash rapidly settles from the oil, facilitating a very simple mechanical removal.

After removal of the solids from the oil, much of the remaining nitrogen may be conveniently removed by a non-catalytic aqueous sulfuric acid treatment of the whole shale oil, or fractions thereof. It has been found that when the sulfuric acid concentration is within a specified critical range, acid treatment of the distillate fraction produced a product which meets the specifications for commercial and military diesel and jet fuels. By hydrotreating whole raw shale oil in a back-mixed reactor, a substantially ash-free oil can be produced. Although, by proper selection of the process conditions, over 90% of both the sulfur and nitrogen contaminants can be simultaneously removed along with the ash, further treatment of the hydrotreated, ash-free shale oil is usually desirable. The present invention also provides methods of second-stage treatment of producing dedusted shale oil to yield commercial specification distillate. Thus, the present invention provides an improved, economical method for dedusting whole, dusty raw shale oil which can readily be further upgraded, if desired, by one of several second-stage treatments to provide a further method for producing commercial specification products from whole, raw dusty shale oil.

As used in this application, the term "dust" means particles derived from oil shale. The particles range in size from less than 1 micron to several microns and include retorted and raw unretorted particles of oil shale, as well as spent oil shale, if the latter is used as solid heat carrier material during retorting. Dusts derived from retorting oil shale consist primarily of clays, calcium, magnesium oxides, carbonates, silicates and silicas.

The term "retorted oil shale" as used in this application refers to oil shale which has been retorted to liberate hydrocarbons, leaving an inorganic material containing carbon residue.

The term "whole shale oil" or "raw shale oil" refers to the untreated retorted oil shale.

The term "spent oil shale" as used in this application refers to oil shale from which most of the carbon residue has been removed by combustion.

The term "synthetic oil" as used herein means oil which has been produced from oil shale. The synthetic oil in the present process is dedusted according to the principles of the present invention before being fully upgraded.

The term "dust-laden" or "dusty" synthetic oil as used herein means a synthetic oil which contains a substantial amount of entrained particulates derived from oil shale dust.

The abbreviation "LHSV" as used herein refers to liquid hourly space velocity.

The abbreviation "SCFB" as used herein refers to standard cubic feet of hydrogen per barrel of hydrocarbon.

The terms "normally liquid", "normally gaseous", "condensable", "condensed", or "noncondensable" are relative to the condition of the subject material at a temperature of 77° F. (25° C.) at atmospheric pressure.

A more detailed explanation of the invention is provided in the following description and appended claims taken in conjunction with the accompanying drawings.

DETAILED DESCRIPTION OF PREFERRED EMBODIMENT

Figure 1:
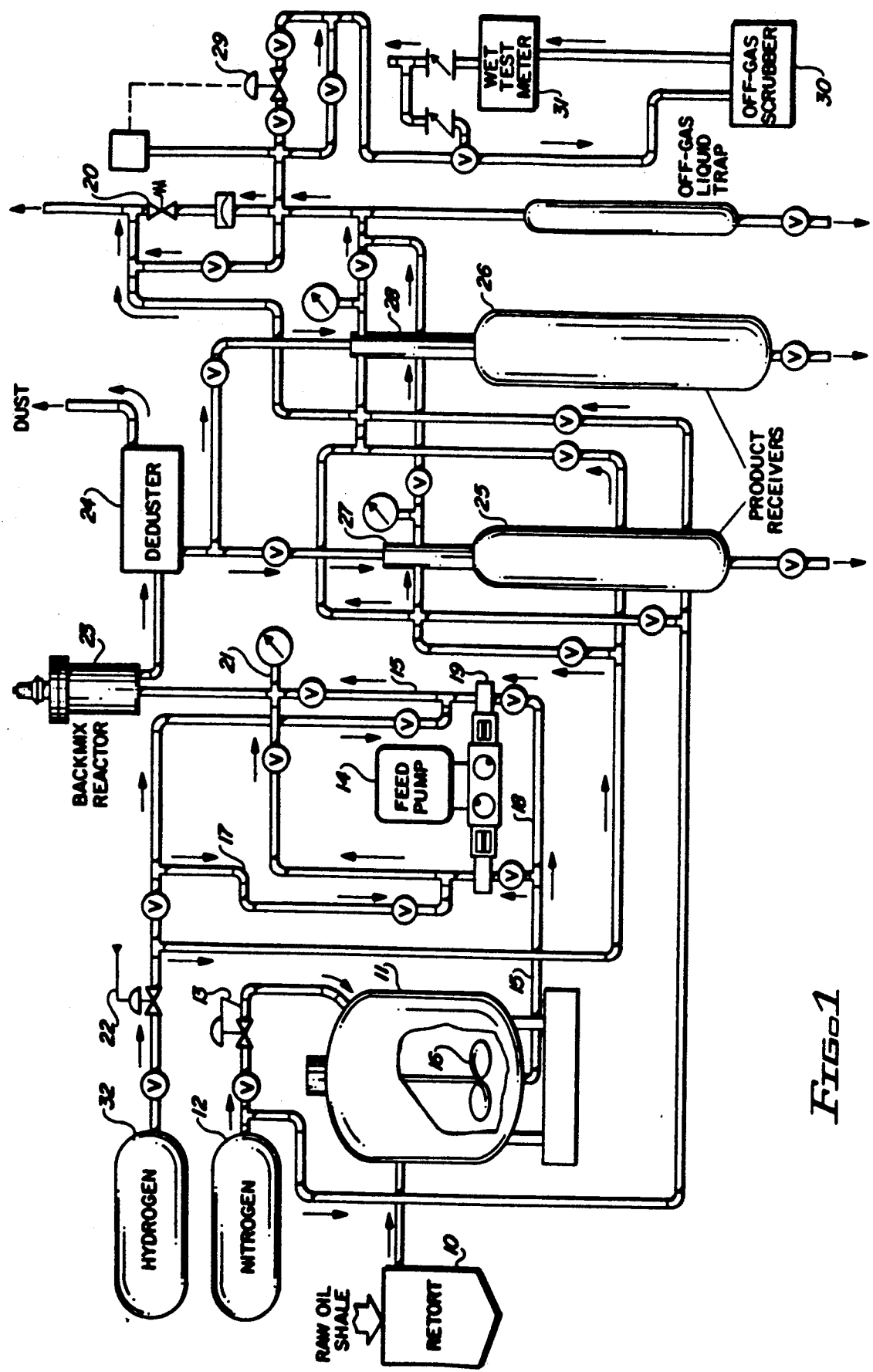
FIG. 1 is a schematic flow diagram of a process for dedusting and upgrading whole raw shale oil by severe hydrotreating under agitation in accordance with the principles of the present invention.

Referring to FIG. 1, raw dusty shale oil is processed in retort 10 to produce an effluent product stream which is conveyed to feed tank 11 having agitator 16. Tank 11, which is nitrogen blanketed to retard aging of the raw, dusty shale oil, is connected to nitrogen supply system 12 equipped with feed control valving means 13. Dusty shale oil is fed by adjustable rate pump 14, such as a Bran-Lubbe pump, through heated line 15. Hydrogen feed stream 17 is introduced into transfer line 18 at the pump discharge means 19. Hydrogen supply pressure control valve assembly 21 and hydrogen feed rate control valving 22 together control the flow of hydrogen from supply tank 32 to the feed stream 17. Flowing hydrogen assists in transporting the shale dust so as to prevent settling out as oil temperature is increased. The oil-hydrogen mixture is fed into a backmix reactor 23 equipped with a variable speed agitator (not shown). Reactor pressure control valve means 20 maintains the reactor pressure during processing. Product oil and agglomerated dust leave the reactor through deduster 24 where dust is extracted and dedusted shale oil is transported to and accumulated in product receivers 25 and 26.

Reactor off-gas is vented through tops 27 and 28 of the receivers and passed through let-down valve 29 through scrubber 30 to wet test meter 31.

Figure 2:
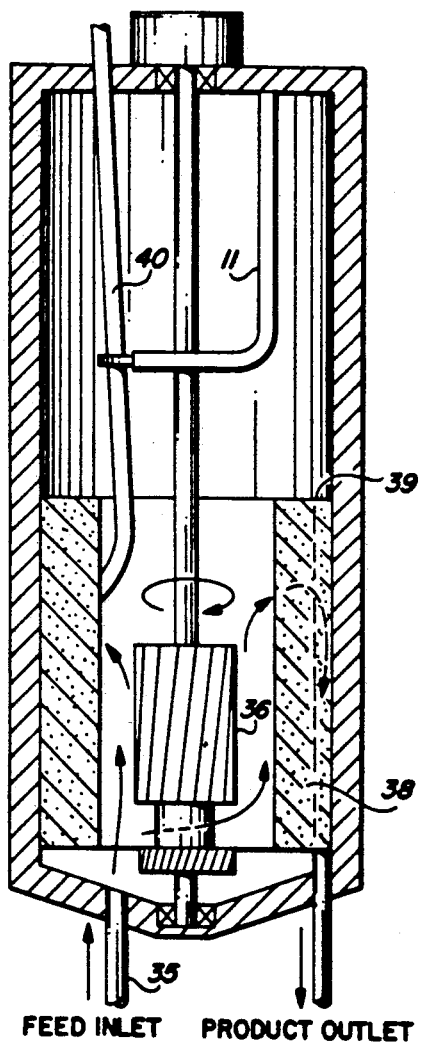
FIG. 2 is an elevational view of an ebullated bed catalytic reactor preferred for use in dedusting and upgrading whole dusty shale oil in accordance with the principles of the present invention, with parts cut away for clarity.

As shown in FIG. 2, which best shows the internal detail of reactor 23 of FIG. 1, oil assisted by hydrogen flow enters the reactor through feed inlet 35 and is maintained in a state of agitation, supplied by variable speed agitator 36, sufficient to prevent settling of the dust entrained in it. Catalyst 38 is contained in annular basket 39 surrounding the agitator. Heat is applied to the reactor by thermowell 40 fixed by support 41.

Figure 3:
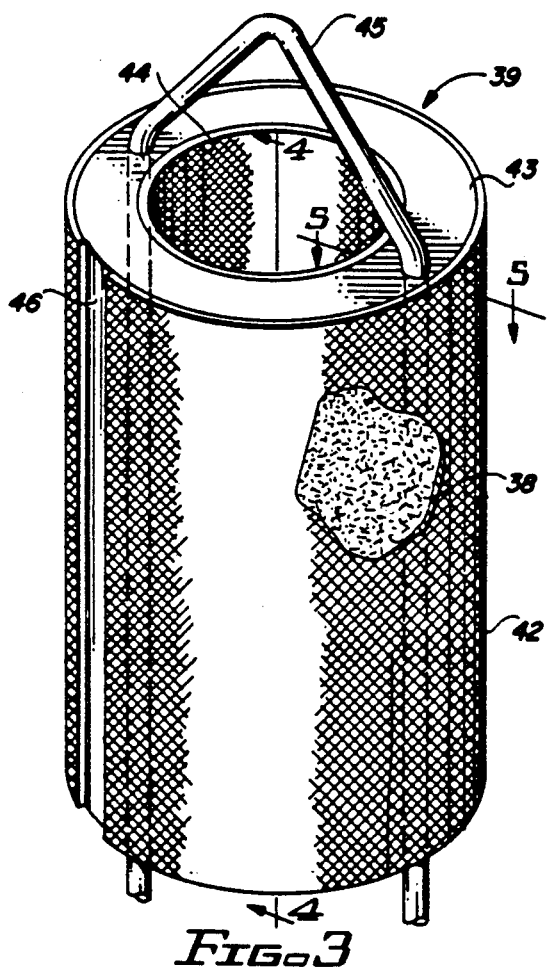
FIG. 3 is an elevated end view of the catalyst basket of FIG. 2.
Figure 4:
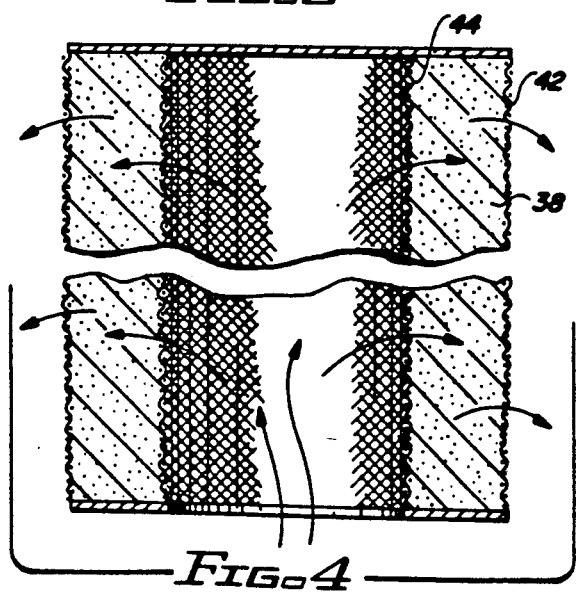
FIG. 4 is an isolated cross-sectional view of the catalyst basket taken along lines 4—4 of FIG. 3.
Figure 5:
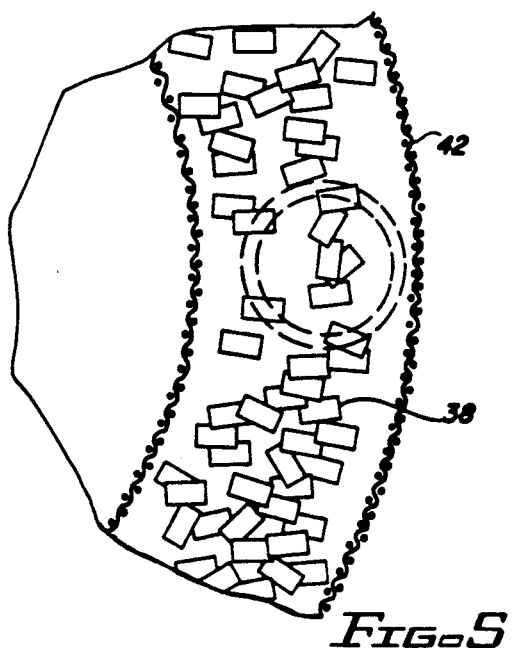
FIG. 5 is a fragmented detailed plan view of the basket.

FIGS. 3, 4 and 5 better depict the detail of basket 39. Basket outer side-wall 42 is formed of mesh of suitable gauge to confine the catalyst 38 within basket chamber 43 formed by the outer wall 42 and inner wall 44. Frame handle 45, shown partially in phantom, acts as support for the basket assembly while orientation channel 46 aids in positioning the basket within the reactor.

The hydrotreating catalyst is preferably high-activity alumina-supported extruded cylinders of catalytic material described in greater detail below. While cylinders of about 1/16 inch diameter are preferred, the size may vary widely. If small size catalyst grains are used, care should be exercised to ensure they do not trap shale dust and blind the bed. It is necessary to maintain adequate agitation in the reactor throughout residency, especially when hydrotreating temperatures are reached because of the marked tendency of the dust being agglomerated to coat the reactor.

In practice, whole dusty shale oil is catalytically hydrotreated in the presence of a hydrotreating gas at a pressure of from 500 to 3000 psi, preferably 1000 to 2500 and most preferably 1500 to 2000 psi, at a temperature of from 650° to 850° F., preferably 725° to 825°, and most preferably from 750° to 800° F., and at a space velocity of from 0.1 to 6.0 $hr^{-1}$, preferably 0.3 to 3.0 and most preferably 0.5 to 2.5 $hr^{-1}$ whereby the suspended particulates are agglomerated to facilitate solid-liquid separation and substantial amounts of sulfur and nitrogen contaminants are simultaneously removed from the resulting dedusted, upgraded synthetic oil.

Preferred catalysts are those disclosed in U.S. Pat. Nos. 4,462,897; 4,224,144; 4,476,011; 3,789,156; and 4,454,026, incorporated by reference herein. Especially preferred catalysts are NiMo, CoMo, or NiW supported on alumina or silica-alumina and NiMo or CoMo optionally promoted with phosphorus components.

The following examples further illustrate the present invention.

EXAMPLE 1

Several shale oil feeds were prepared which contained from 2.9 to 10.3 weight percent ash by mixing residual shale oil containing from 40–60 weight percent ash with an ash free shale oil obtained from Amoco Corporation's underground retort in Colorado.

The ash content of the mixed shale oils was determined by the following procedure. A shale oil sample of approximately 5 grams was accurately weighed. On a hot plate, under low heat, volatile hydrocarbons were evaporated. After evaporation of the volatile compounds, the sample dish was covered and placed in an oven at 1000° F. for three hours to burn off the remaining organic material. The remaining ash was accurately weighed to determine the percent ash in the sample. Two determinations were made for each shale oil sample, and the results were found to agree within ±0.2%.

Hydrotreating of raw shale oil was conducted in an automated pilot plant equipped with a continuous stirring autoclave reactor. The catalyst volume was 25.0 cc or 19.1 g of catalyst. The catalyst was placed in a basket inside the reactor. The catalyst composition was 4.1 wt. % $P_2O_5$/3.5 wt. % NiO/18 wt. % $MoO_3$ supported on alumina. The oil volume inside the reactor was 100 cc. The reactor pressure was maintained at 800 psi with a hydrogen flow rate of approximately 0.5 SCF/Hr. The temperature was maintained at either 800° F. or 825° F., and the feed rate adjusted to give space velocities in the range of 0.75 to 3.5 $hr^{-1}$.

Hydrotreated samples were submitted for Inductively Coupled Plasma Analysis for low level ash determination. For all hydrotreated samples, ash levels were too low to be determined by the burning method described above.

EXAMPLE 2

Solids (ash) free shale oil was hydrotreated at 800° F., 1800 psi and space velocities of 0.88 and 2.87 $hr^{-1}$ with the catalyst described in Example 1. At a space velocity of 0.88 $hr^{-1}$, 98% of the sulfur and 64% of the nitrogen was removed. The feed was changed to a shale oil containing 2.9 weight percent ash. Under the above conditions and with a space velocity of 2.87 $hr^{-1}$, 94% of the sulfur and 66% of the nitrogen was removed. These results indicate that in the presence of solids, the catalyst performance was unchanged.

EXAMPLE 3

The hydrotreated ash-containing shale of Example 2 was allowed to settle for approximately 1 to 2 hours. After settling, a decanted sample was analyzed for suspended solids and found to contain 315 ppm total solids in the product. Analysis of the major components yielded: Mg, 125 ppm; Ca, 68 ppm; Si, 49 ppm; Fe, 38 ppm. Lesser amounts of Ba, Mn, K, Na, Ni, Zn and B were also detected. The hydrotreated material was gravity filtered through filter paper and analyzed for solids as described in Example 1. After filtration, the sample contained 15 ppm ash.

EXAMPLE 4

The ash-containing shale oil of Example 2 was further hydrotreated at a space velocity of 1.22 $hr^{-1}$ at 800° F. and 1800 psi. Under these conditions, desulfurization was 97% and denitrogenation was 93%. The hydrotreated oil was suction-filtered through a 10–15 micron glass filter frit. The resulting product contained 2 ppm total solids.

EXAMPLE 5

The feed to the unit was changed to whole raw shale oil containing 10.3 weight percent ash. Following hydro-treatment at 800° F., 1800 psi and 3.35 $hr^{-1}$ space velocity, 92% desulfurization and 60% denitrogenation was obtained. The hydrotreated sample was allowed to settle, and the ash content was determined to be 15 ppm.

EXAMPLE 6

The feed to the unit was changed to whole, raw shale oil containing 5.3 weight percent ash, the temperature was set to 700° F. and the pressure maintained at 1000 psi. The feed rate was adjusted to obtain a space velocity of 1.10 $hr^{-1}$. Under those conditions, desulfurization was 58%, denitrogenation was 17% and solids analysis of the settled, hydrotreated oil gave 16 ppm suspended ash.

Examples 1–6 demonstrate that in a back-mixed reactor, whole, raw shale oil containing high solids levels can be hydrotreated without even initial partial dedusting, and that the solids are easily removed from the upgraded oil. In addition, under the proper conditions, high levels, over 90%, of both sulfur and nitrogen can be removed.

By hydrotreating whole, raw shale oil, a substantially solids-free oil can be produced. Although with the proper selection of process conditions, over 90% of both sulfur and nitrogen contaminants can be removed, none of the above products were upgraded to the extent that specification fuels were produced.

Ash-free hydrotreated shale oil was further upgraded to produce such commercial grade fuels by one of two processes to produce finished products as illustrated by the following examples. In one process, much of the remaining nitrogen was removed by a non-catalytic aqueous sulfuric acid treatment of the whole shale oil, or fractions of the shale oil. In the second process, ash-free shale oil was hydrotreated in a fixed-bed catalytic reactor to obtain the desired product.

EXAMPLE 7

Initially, small samples of ash-free shale oil were extracted with equal volumes of various concentrations of aqueous sulfuric acid. The ash-free shale oil, prepared by the process of Example 1, contained 1125 ppm total nitrogen. Treatment with 25% sulfuric acid reduced the nitrogen content to 384 ppm. A second treatment with 25% sulfuric acid reduced the nitrogen content to 361 ppm. A single treatment with 50% sulfuric acid reduced the nitrogen content to 251 ppm. After several days, only the sample which had been treated with 50% sulfuric acid remained clear and bright. All other samples were cloudy and brown.

EXAMPLE 8

A 1000 gram composite sample of ash-free whole shale oil, produced by the process of Example 1, was analyzed and found to contain 0.1228 weight percent nitrogen. The sample was mixed with an equal volume, 900 mL, of 50 weight percent aqueous sulfuric acid. The acid/oil mixture was well shaken and allowed to separate into two phases. The oil was decanted and treated again with 900 mL of 50% aqueous sulfuric acid. The separated oil was washed with 2000 mL of dilute barium hydroxide and then with 1000 mL of water. The final product contained 202 ppm nitrogen (84% denitrogenation). Half of the oil was distilled into three fractions, naphtha, distillate and gas oil. Yields and nitrogen distributions are given in Table I.

TABLE I

| Sample | |
|---|---|
| Whole product | |
| N, ppm (untreated) | 1,228.0 |
| N, ppm (acid treated) | 202.0 |
| IPB-360, wt % | 10.0 (API = 54.1) |
| N, ppm | 1.7 |
| Basic N, ppm | >5.0 |
| 360–650, wt % | 57.4 (API = 37.6) |
| N, ppm | 89.0 |
| Basic N, ppm | 5 |
| 650+, wt % | 31.8 (API = 29.9) |
| N, ppm | 450.0 |
| Basic N, ppm | 15 |
| Whole product | |
| N, ppm | 1,228.0 |
| N, ppm (acid treated) | 202.0 |

EXAMPLE 9

A sample of ash-free oil, prepared by the method of Example 1 (1111.5 g) was extracted with an equal volume of 60 weight percent aqueous sulfuric acid (2733.0 g). The mixture was shaken and allowed to settle for 15 minutes. The separated product (1028.5 g, 92% recovery) was distilled into three fractions. Analysis and nitrogen distribution is given in Table II. The distillate fraction was submitted for ASTM D2274 color-gum stability determination. The aged color was 0.5 and the sediment formation was 0.54 mg/100 mL. Both tests passed current specifications for distillate fuel.

The used acid was diluted to 30% with water. From the diluted acid was recovered 34.4 g of a dark heavy oil (3.1% recovery). The total oil recovery was 95.6%.

TABLE II

| Whole product | |
|---|---|
| N, ppm (untreated) | 1,160.0 |
| N, ppm (acid treated) | 109.0 |
| Basic N, ppm (untreated) | 768.0 |
| Basic N, ppm (acid treated) | 5.0 |
| IPB-360, wt % | 18.05% (API = 53.8) |
| N, ppm | 15.0 |
| Basic N, ppm | 5.0 |
| 360–650, wt % | 34.7% (API = 39.7) |
| N, ppm | 20.0 |
| Basic N, ppm | 5.0 |
| 650+, wt % | 47.1% (API = 33.8) |
| N, ppm | 297.0 |
| Basic N, ppm | 14.0 |

EXAMPLE 10

A composite sample of hydrotreated ash-free shale oil of days 3,4,5 and 6 runs (Example 1) was analyzed and found to contain 0.1240% total nitrogen and 0.0652% basic nitrogen. Approximately one-half of the sample was distilled into three fractions. Each fraction was analyzed for carbon, hydrogen, nitrogen and basic nitrogen.

The remaining half of the sample was treated with an equal volume of 65 weight percent aqueous sulfuric acid. The oil fraction was separated, washed with 1000 mL of water, and distilled into three fractions. To the naphtha and distillate fractions were added 25 ppm of a commercial gum inhibitor (Fuel Oil Additive #3, E.I. Dupont). The acid-extracted fractions were analyzed for carbon, hydrogen, nitrogen and basic nitrogen.

The distillate fractions with 25 ppm gum inhibitor had an aged color of less than 0.5 amd sediment formation of 0.43. Both analyses passed specifications for distillate fuel.

It can be seen that shale oil samples containing 0.1 to 0.2 weight percent nitrogen, products of lower nitrogen content, result from aqueous sulfuric acid treatment. When the sulfuric acid concentration is above 60 weight percent, distillate products meeting gum stability specification can be produced. If 25 ppm gum stabilizer is added, distillate meeting stability specifications are produced for shale oil treated with 40 weight percent sulfuric acid.

Generally speaking, low color and color stable distillate products are obtained when the sulfuric acid concentration is above 50 weight percent. Therefore, both color and gum specifications can be met for distillate treated with sulfuric acid having a concentration of 50 weight percent or greater. It is preferred to add gum stabilizer, however, when the sulfuric acid concentration is below 60 weight percent.

EXAMPLE 11

Two ash-free shale oils that had been hydrotreated in a back-mixed reactor, one at 740° F., 1.5 LHSV and 1800 psig and the other at 720° F., were decanted to remove solids and then processed in fixed bed reactors over a NiMoP on alumina catalyst (American Cyanamid, 3.2% NiO, 17.8% $MoO_3$, 1.6% P on $Al_2O_3$ support) at temperatures of from 750° to 850° F., pressures of from 1200 to 2000 psig, flow rates of from 0.5 to 2.0 $hr^{-1}$ and 0.3 to 1.75 LHSV to yield products ranging from about 20 to 2500 ppm nitrogen in the total liquid product. Effects of pressure, temperature and space velocity were investigated as follows.

The pretreated, ash-free oils were hydrotreated downflow in a fixed bed using an automated, high pressure miniunit. The reactor was a ⅜" id heavy wall stainless steel tube with a ⅛" thermowell up the center. The catalyst, NiMo on alumina promoted with phosphorus, was used in the form of 1/32" extrudates with an average length of about 1/10". After loading the reactor with catalyst, it was placed in the heater block of the unit and heated to 300° F. The catalyst was then soaked with high sulfur vacuum gas oil before the reactor was sealed. After a nitrogen purge, the catalyst was sulfided with a mixture of 8 vol. percent $H_2S$ in hydrogen for one hour each at 300° F., 400° F., 600° F. and 700° F. The unit was then pressured to 1800 psig and hydrogen flow established at about 0.5 ft/hr. With the temperature at 700° C., shale oil was introduced at a rate of 16 cc/hr. After two hours, the reactor temperature was raised to 750° F. The product from the liquid let down valve was collected for 24 hour periods and analyzed. When a material balance was made, two samples of off gas were analyzed by gas chromatography. Using the total volume of off gas during the material balance period and the gas composition along with the weight of liquid product collected, the material balance was calculated based on carbon balance.

After 3 to 10 days at each set of operating conditions, a material balance was made and the conditions were changed. Table III gives the conditions used.

TABLE III

| Feed # No. | Condition No. | Pressure psig | Temp °F. | LHSV | H rate/hr |
|---|---|---|---|---|---|
| 1 | 1 | 1800 | 750 | 1.0 | 1.0 |
| 1 | 2 | 1800 | 750 | 0.5 | 0.5 |
| 1 | 3 | 1800 | 770 | 1.0 | 1.0 |
| 1 | 4 | 1800 | 770 | 0.5 | 0.5 |
| 1 | 5 | 1800 | 770 | 1.0 | 2.0 |
| 1 | 6 | 1800 | 750 | 1.0 | 1.0 |
| 1 | 7 | 1200 | 750 | 0.5 | 0.5 |
| 1 | 8 | 1200 | 750 | 1.0 | 1.0 |
| 1 | 9 | 1800 | 750 | 1.0 | 1.0 |
| 1 | 10 | 2000 | 750 | 1.0 | 1.0 |
| 2 | 11 | 2000 | 750 | 1.0 | 1.0 |
| 2 | 12 | 1800 | 750 | 1.0 | 1.0 |
| 2 | 13 | 1500 | 750 | 1.0 | 1.0 |
| 2 | 14 | 1800 | 750 | 1.0 | 1.0 |
| 2 | 15 | 1800 | 750 | 1.75 | 1.0 |

The first nine tests were run using a single loading catalyst, while tests at conditions 10-15 used a second loading of the same catalyst. Test numbers 1,6,9,12 and 14 were conducted under the same conditions and were made to check the activity of the catalyst.

Product from eight different conditions were distilled using an eight plate still. Cuts were made at 180° F., 360° F. and 650° F. The first two cuts were made at atmospheric pressure and cut three was made at 45 mm Hg. Nitrogen, sulfur and API gravity were determined on each cut were sufficient sample was available.

After about 5 days, the product nitrogen content was constant at about 590 ppm. After about 2 weeks at 770° F., the catalyst was found to give a product nitrogen of about 740 ppm when conditions were returned to those used during the first 11 days of the run. On day 54, the unit conditions were set at start of run conditions after the catalyst had operated for about days at a pressure of 1200 psig and a temperature of 750° F. It was observed that the product nitrogen decreased from 1150 ppm on day 58 to 770 ppm on day 64. Also, early in the run when the space velocity was reduced on day 11 from 1.0 to 0.5, the product nitrogen continued to decline for about six days before it stabilized at a new low level. These two sets of data indicate that the catalyst is very slow to come to a steady state after a process condition change is made to give more denitrogenation. At less severe conditions, the data is not as clear, but it would appear that a new steady state is reached more rapidly.

It has been established that in a back-mixed reactor, shale oil containing high solids levels can be hydrotreated and simultaneously, the solids easily separated from the treated oils. Complete separation of ash and shale oil was effected over a wide range of process conditions. Further upgrading can be carried out either by treatment with aqueous sulfuric acid or by hydrotreating to provide commercial grade products.

Although embodiments of the invention have been shown and described, it is to be understood that various modifications and substitutions, as well as various additions, rearrangements and combinations of process steps, can be made by those skilled in the art without departing from the novel spirit and scope of the invention.

The invention claimed is:

1. A process for simultaneously upgrading and dedusting liquid hydrocarbon feedstocks comprising the steps of:
   (a) injecting dust particulate-containing raw retort effluent product stream from a feed line into a catalytic hydrotreater capable of agitating the product stream during hydrotreatment;
   (b) agitating the product stream with a hydrotreating gas upstream of said hydrotreater to substantially prevent settling of particulate matter in the feed line;
   (c) agglomerating said particulates to enhance solid-liquid separation and removing at least 90% of sulfur and nitrogen contaminants to produce synthetic crude oil by hydrotreating said product stream in the presence of a hydroprocessing catalyst at a temperature of from about 760° to about 825° F., under a hydroprocessing gas pressure of from about 1500 to about 2500 psi and at a space velocity of from about 0.1 to about 6.0 $hr^{-1}$; and
   (d) substantially separating the agglomerated particulates from the hydrotreated oil.

2. A process for simultaneously upgrading and dedusting liquid hydrocarbon feedstocks comprising the steps of:
   (a) injecting dust particulate-laden raw effluent product stream from a retort feed line into an ebullated bed hydrotreater;
   (b) agitating the product stream with a hydrotreating gas upstream of said hydrotreater to substantially prevent settling of particulate matter in the feed line;
   (c) agglomerating said particulates to enhance solid-liquid separation and removing at least 90% of sulfur and nitrogen contaminants to produce synthetic crude oil by hydrotreating said product stream in the presence of a hydroprocessing catalyst at a temperature of from about 760° to about 825° F., under a hydroprocessing gas pressure of from about 1500 to about 2500 psi and at a space velocity of from about 0.1 to about 6.0 $hr^{-1}$;
   (d) substantially removing the agglomerated particulates from the hydrotreated oil;
   (e) extracting the oil with aqueous sulfuric acid to reduce the nitrogen content thereof; and
   (f) water washing the extracted oil to substantially remove the sulfuric acid therefrom.

3. The process of claim 2 wherein said aqueous sulfuric acid has a concentration of greater than about 40%.

4. A process for concurrently upgrading and dedusting liquid hydrocarbon feedstocks comprising the steps of: (a) retorting oil shale to liberate an effluent stream of dust laden hydrocarbons; (b) feeding the raw, dust-laden retort effluent product stream into a catalytic hydrotreater; (c) agitating the product stream in the hydrotreater to constantly maintain the dust particles in suspension within the oil; (d) catalytically hydrotreating the agitated product stream in the presence of a hydroprocessing gas at a pressure of from about 500 to about 3000 psi, a temperature of from about 650° to about 850° F. and a space velocity of from 0.1 to 6.0 $hr^{-1}$, whereby the suspended particulates are agglomerated to facilitate solid-liquid separation and at least 90% of sulfur and nitrogen contaminants are simultaneously removed from the resulting upgraded oil; and (e) mechanically separating the aggolomerated particulates from the upgraded whole oil.

5. The process of claim 4 wherein the product stream consists essentially of unstabilized dusty shale oil.

6. The process of claim 4 wherein the hydroprocessing gas is substantially hydrogen.

7. The process of claim 4 wherein said product stream is agitated with the hydroprocessing gas prior to entering the hydrotreater.

8. The process of claim 5 wherein the hydroprocessing gas is injected into the oil upstream of an ebullated bed reactor, and said hydroprocessing gas and said product stream are injected together into said hydrotreater.

9. A process in accordance with claim 4 wherein the dedusted, upgraded oil from step (e) is hydrotreated in a fixed bed reactor to further reduce the level of sulfur and nitrogen contaminants.

10. The process of claim 9 wherein said oil is further upgraded by treatment with aqueous sulfuric acid.

* * * * *

UNITED STATES PATENT AND TRADEMARK OFFICE
CERTIFICATE OF CORRECTION

PATENT NO. : 5,009,770
DATED : April 23, 1991
INVENTOR(S) : Jeffrey T, MILLER, ALBERT L. HENSLEY, JR.

It is certified that error appears in the above-identified patent and that said Letters Patent is hereby corrected as shown below:

Col. 3, line 42, "Luroi/Ruhroas" should read --Lurgi/Ruhrgas--.

Signed and Sealed this

Twenty-sixth Day of January, 1993

Attest:

DOUGLAS B. COMER

Attesting Officer   Acting Commissioner of Patents and Trademarks